BANDWIDTH CHANGING MEANS FOR ELECTRICAL SIGNALS

Filed April 2, 1962 3 Sheets-Sheet 1

INVENTOR.
FRANCIS P. KEIPER JR.
BY
Robert D. Sanborn
ATTORNEY

BANDWIDTH CHANGING MEANS FOR ELECTRICAL SIGNALS

Filed April 2, 1962 3 Sheets-Sheet 2

INVENTOR.
FRANCIS P. KEIPER JR.

BY Robert D. Santon

ATTORNEY

BANDWIDTH CHANGING MEANS FOR ELECTRICAL SIGNALS

Filed April 2, 1962 3 Sheets-Sheet 3

INVENTOR.
FRANCIS P. KEIPER, JR.
BY
Robert D. Saxton
ATTORNEY

United States Patent Office 3,209,263 Patented Sept. 28, 1965

3,209,263
BANDWIDTH CHANGING MEANS FOR ELECTRICAL SIGNALS

Francis P. Keiper, Jr., Oreland, Pa., assignor to Philco Corporation, Philadelphia, Pa., a corporation of Delaware Filed Apr. 2, 1962, Ser. No. 184,176
7 Claims. (Cl. 328—55)

The present invention relates to signal processing systems and more particularly to systems for changing the bandwidth or data content of one or more periodic signals.

Area scanning systems of the type employed in television or facsimile transmission systems, character recognition systems, or the like, generate signals having a bandwidth determined by the rate and type of scan and by the amount of detail present in the area scanned. In some instances it is necessary to transmit information derived from the scanning means over a data link having a bandwidth capability different from the normal bandwith of the signal provided by the scanning system. The data link may be a wire line or radio channel, for example, and the bandwidth capability of the data link may be greater than or less than the normal bandwidth of the signal generated by the scanning system. If the bandwidth capability of the data link is less than the normal bandwidth of the generated signal, information will be lost if the generated signal is sent without modification through the limited bandwidth data link. On the other hand, if the bandwidth of the generated signal is appreciably lower than that which can be handled by the data link, spectrum space and/or transmission time are inefficiently utilized.

Therefore it is an object of the present invention to provide a system for changing the bandwidth and/or data content of an input signal.

A further object of the present invention is to provide a system for decreasing the apparent bandwidth of an input signal.

Still another object is to provide a system for increasing the bandwidth of an input signal.

A further object of the present invention is to provide a system for multiplexing two or more input signals on a single data channel.

An additional object of the present invention is to provide a system for modifying the apparent scan pattern of an image scanning device.

In general the invention comprises a plurality of tapped signal delay means having the same or different delay times. A plurality of gate means interconnect the taps of the several delay means. Control means are connected to said gate means for conditioning said gate means to pass signals at spaced time intervals. The spacing between the time intervals at which said gates are conditioned is determined by the over-all delay time of one or more of the delay means. The duration of the intervals is determined by the delay time between adjacent taps on one or more delay means. Means are provided for supplying an input signal to the input of at least one of the delay means and means are provided for deriving an output signal from at least one of the delay means.

For a better understanding of the present invention together with other and further objects thereof, reference should now be had to the following detailed description which is to be read in conjunction with the accompanying drawings in which FIG. 1 is a block diagram of a system for decreasing the effective bandwidth of an input signal;

FIG. 2 comprises a series of waveforms which may be present at different points in the system of FIGURE 1;

Figure 4:
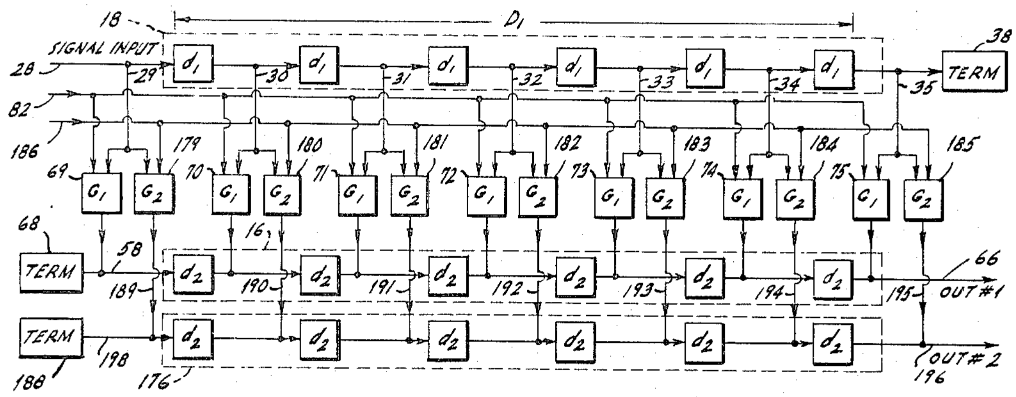
FIG. 4 is a block diagram of a system similar to the system of FIGURE 1 but having two output channels.
Figure 5:
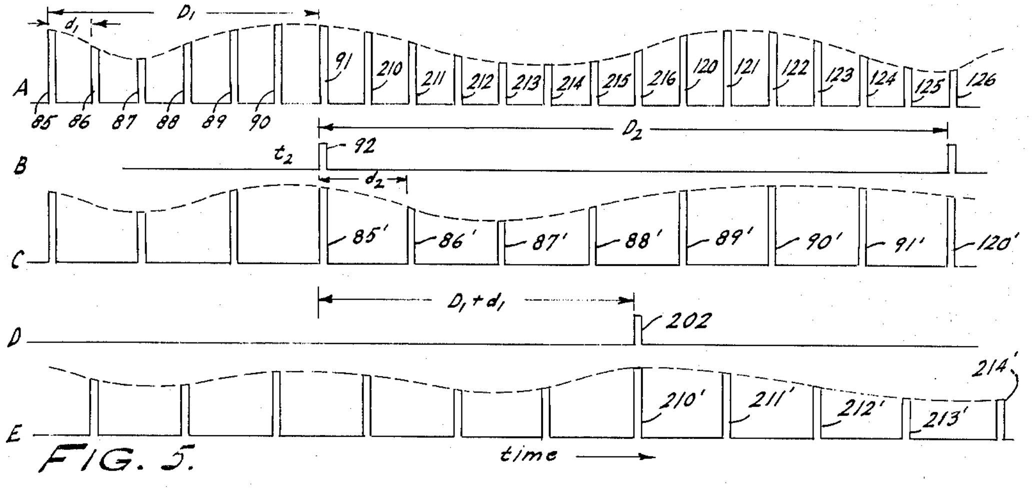
Figure 6:
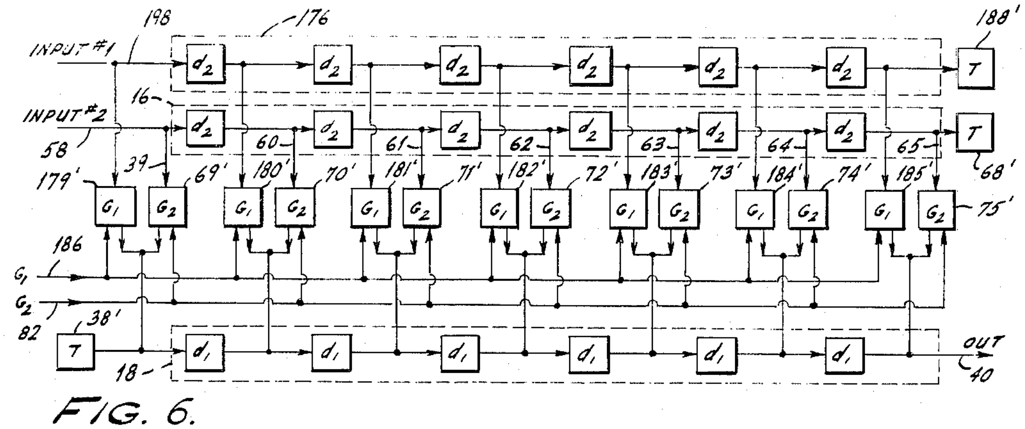
Figure 7:
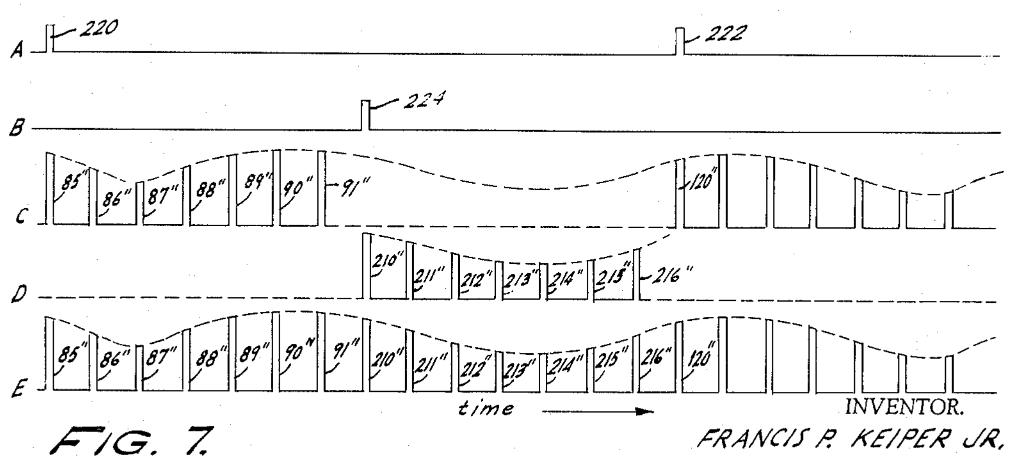
Figure 8:
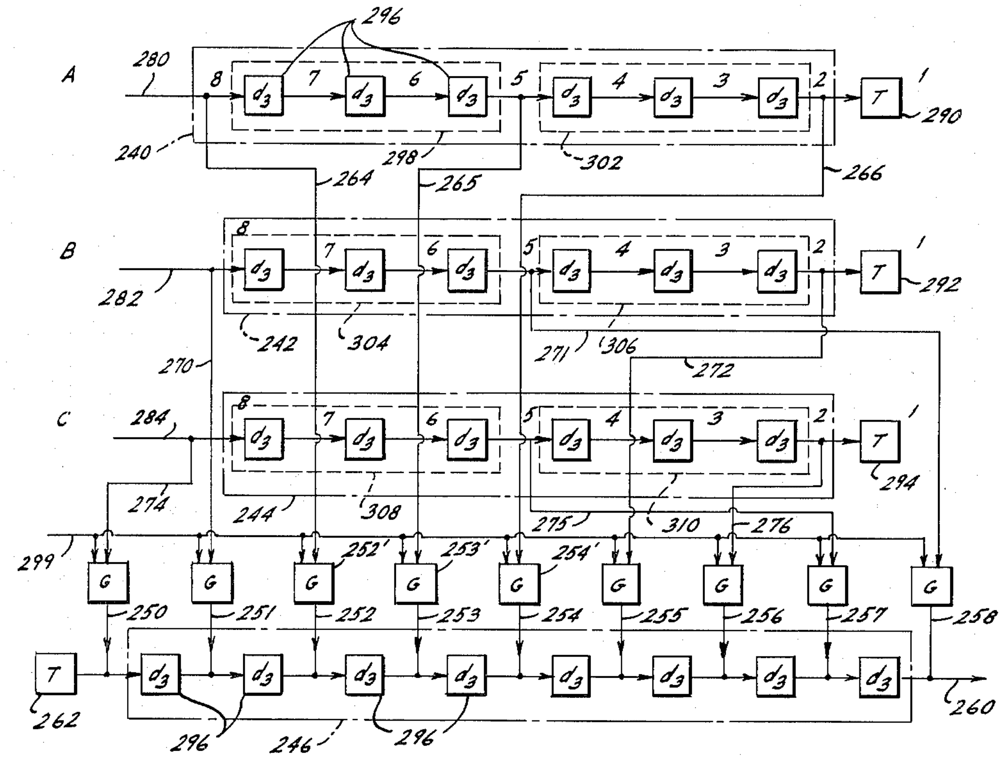
Figure 9:
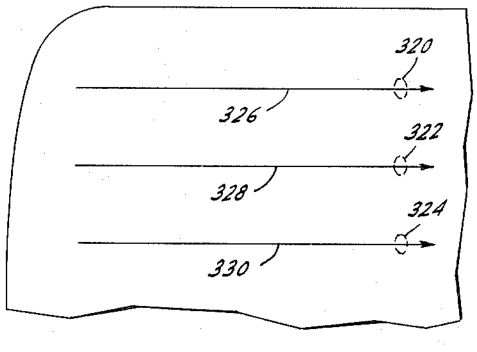
Figure 10:
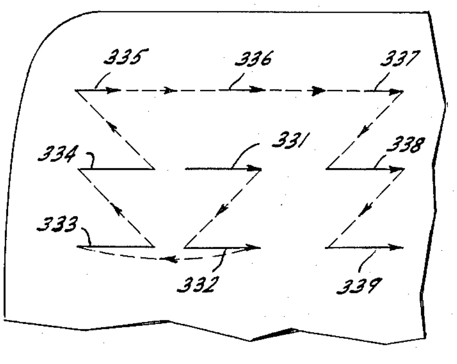

FIG. 5 comprises a series of waveforms which illustrate the operation of the system of FIG. 4;

FIG. 6 is a block diagram of a system for combining two input signals in a single output channel;

FIG. 7 comprises a series of waveforms which may be present in the system of FIG. 6;

FIG. 8 is a block diagram of still another system for multiplexing a plurality for input signals on a single output channel; and FIGS. 9 and 10 are plots showing the scan pattern modification which may be achieved through the use of the system of FIGURE 8.

Figure 1:
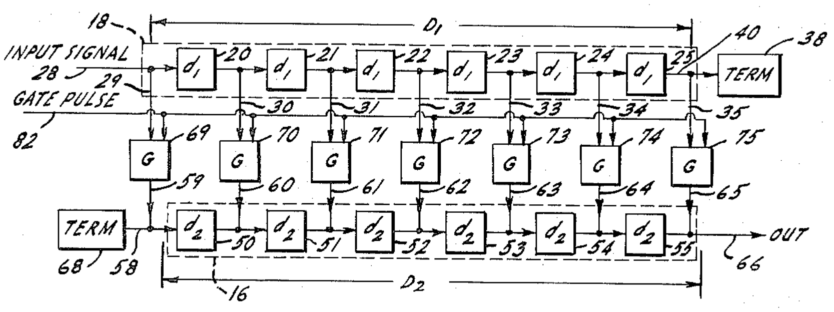

The system of FIGURE 1 comprises two tapped delay means 16 and 18. Delay means 16 and 18 may be lumped constant delay lines, distributed parameter delay lines, shift registers or the like. By way of example it will be assumed that delay means 18 is a lumped constant delay line made up of a plurality of similar, serially connected sections 20–25 and that each of these sections 20–25 has a delay of $d_1$ seconds. The over-all delay of delay means 18 is equal to $nd_1$ or $D_1$ seconds where $n$ is the number of sections.

An input connection 28 is provided for supplying signals to the first section 20. Signals may be extracted from delay means 18 at each of the taps 29–35. Tap 29 is connected directly to input connection 28 and hence there is no time delay between input connection 28 and tap 29. A non-reflective termination 38 is connected to the output connection 40 of delay means 18. Output connection 40 corresponds also to tap 35.

Delay means 16 in FIGURE 1 comprises a plurality of similar, serially connected sections 50–55 each having a time delay $d_2$ which is greater than the time $d_1$. By way of example, $d_2$ may equal $2d_1$. Delay means 16 is provided with an input connection 58, a series of taps 59–65 and an output connection 66. Again, in the example chosen for illustration in FIGURE 1, tap 59 is connected directly to input connection 58 and tap 65 is connected directly to output connection 66. A non-reflective termination 68 is connected to input connection 58 to absorb any signals which may be propagated from any one of the taps 60–65 towards the input 58.

Seven normally blocked gate circuits 69–75 couple each of the taps 29–35 of delay means 18 to a corresponding one of the taps 59–65 of delay means 16. Gates 69–75 are provided with a commomn input connection 82 to which an unblocking signal may be supplied.

Figure 2:
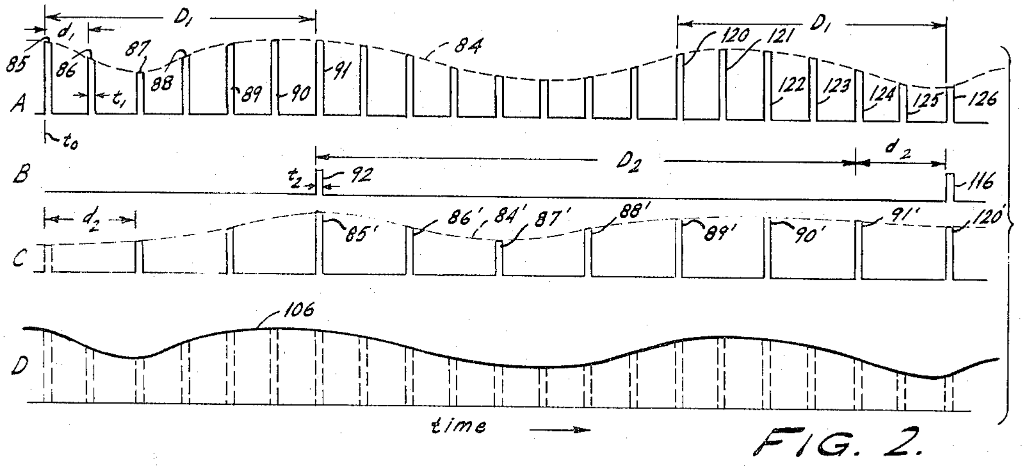

The operation of the system of FIGURE 1 will be explained with reference to the waveforms of FIGURE 2. Waveform A in FIGURE 2 represents a series of amplitude modulated pulses having an interpulse period $d_1$ and a time duration $t_1$. The envelope of the pulses is represented by the broken line 84. It will be assumed that the bandwidth required to transmit the variations in amplitude of the envelope 84 is greater than the available bandwidth of the data link. If a signel represented by the pulses 85–91 or the envelope 84 of waveform A is supplied to input connection 28, the pulses 85–91 will be supplied in succession to input connection 28 and will appear at successive taps 29–35 at times following the initial time $t_0$ by multiples of the delay time $d_1$ for one section of delay line 18.

Waveform B in FIGURE 2 represents the signals supplied to the common gate connection 82. At the time that pulse 92 occurs in waveform B pulses 85–91 will be at taps 35–29 respectively of FIGURE 1. That is, the earliest occurring pulse 85 will have passed the entire length of delay line 18 and will be present at tap 35.

Similarly pulse 86 will have passed from input 28 to tap 34, etc.

Waveform C in FIGURE 2 represents the signals appearing at output connection 66 of delay line 16. Pulse 85' corresponds to pulse 85 which was supplied to input 28 but is delayed by a time interval $D_1$ in delay line 18. Pulse 86' corresponds to pulse 86 of waveform A. However a signal represented by pulse 86' has been delayed by a time interval $(D_1-d_1)$ in delay line 18 and by a time $d_2$ in delay line 16. Similarly pulses 87' to 91' correspond to pulses 87–91 of waveform A.

If a second pulse 116 is supplied to gate input 82 at a time $(D_2+d_2)$ following pulse 92, pulses 120–126 of waveform A will be at terminals 35–29 respectively of delay line 18. Thus a signal corresponding to pulse 120 of FIGURE A will appear as pulse 120' in waveform C.

It will be seen that the pulse repetition rate at the input 28 is equal to $1/d_1$ while the pulse repetition rate at output 66 is equal to $1/d_2$. This represents a stretching of selected portions of the envelope 84. Therefore the effective bandwidth of the signal originally supplied at input 28 has been decreased by the system shown in FIGURE 1. It will be understood that reduction in bandwidth applies only to the envelope 84'. The pulse structure 85'–91' is filtered out either in the data links or in limited bandwidth circuits which precede the data links.

It should be noted that pulses supplied at input connection 28 corresponding to those pulses between pulse 91 and pulse 120 of FIGURE A do not appear at output connection 66. In the system shown in FIGURE 1 these signals and the information represented by the corresponding portion of envelope 84 are necessarily lost in order to provide the increased time for the remaining signals. However, as will be explained in connection with FIGURE 4, it is possible to supply these "lost" pulses to the second limited bandwidth output channel and thereby transmit all of the information supplied at input 28.

In the system shown in FIGURE 1 it is necessary that the delay time $d_1$ of each section of delay line 18 be equal to the interpulse period $d_1$ of the signals supplied to input 28 and that the interval between gate pulses 92, 116, etc. be equal to an integral multiple of the delay time $d_2$ of each section of delay line 16 if a regular spacing is to be maintained between the pulses at output 66. If an amplitude modulated signal as shown by the solid line 106 in waveform D is supplied to input connection 28 the pulses 92, 116, etc. supplied to gates 69–75 will function as sampling signals so that the signals supplied at taps 59–65 of delay line 16 will be the same as the waveform shown at A in FIGURE 2.

As indicated above, the delay lines 16 and 18 may have any convenient form. However by way of further example a schematic diagram of a typical portion of the system as shown in FIGURE 1 is included as FIGURE 3. Parts of FIGURE 3 corresponding to like parts in FIGURE 1 have been identified by the same reference numerals. It will be seen that section 21, for example, comprises a series inductance 150 and shunt capacitors 152 and 154. Capacitor 152 is shared with section 20 and capacitor 154 is shared with section 22. The section 51 of delay line 16 may comprise two serially connected L-C networks 156 and 158 similar to the networks comprising section 21. Thus section 51 will have twice the delay of section 21. Tap 30 on delay line 18 is connected to tap 60 on delay line 16 by way of a bilateral transistor 162. Conduction through transistor 162 is controlled by a diode 164 and a relatively large resistor 165 which are connected in series between bus 166 and bus 167. The junction of resistor 165 and the cathode terminal of diode 164 is connected to the base of transistor 162. The transistor 162 is maintained in an off condition by biasing anode bus 166 slightly positive with respect to the maximum positive excursion of either line. The transistor 162 is turned on to couple terminal 30 to terminal 60 by pulsing bus 166 in a negative direction. Bus 167 is maintained at a fixed negative potential. If pulses of only one polarity are supplied to input connection 28 or if a D.-C. bias is supplied to one or both of the lines 16 and 18 the transistor 162 need not be bilateral. The gates associated with taps 31, 32 etc. may be identical to the gate just described.

The system shown in FIGURE 4 is similar to the system of FIGURE 1 except that a second output line 176 and a second set of gates 179 to 185 has been added. Gates 179–185 couple taps 29–35 to taps 189–195 of delay line 176. Gates 179–185 have a common input connection 186 for receiving enabling pulses. The termination 188 of delay line 176 corresponds to the termination 68 of delay line 16. Output connection 196 and input connection 198 of delay line 176 corresponds to output connection 66 and input connection 58 of delay line 16.

The operation of the system of FIGURE 4 will now be explained with reference to the waveforms of FIGURE 5. Waveforms A, B and C of FIGURE 5 correspond to waveforms A, B and C of FIGURE 2 and like features have been identified by the same reference numerals. Waveform D of FIGURE 5 represents the signal supplied to a second set of gates 179–185 by way of common connection 186. This signal comprises a series of pulses which may be identical to pulses 92, 116, etc. of waveform B except they are displaced in time from pulses 92, 116, etc. by a time $D_1+d_1$. Only one pulse 202 appears on the portion of the time scale shown in FIGURE 5. As explained in connection with the description of FIGURE 1, the pulses 210–216 of waveform A are applied in succession to input connection 28 but appear simultaneously at taps 29–35 at the time pulse 202 is supplied to gates 179–185. The signals derived from pulses 210–216 are transferred from taps 29–35 to the taps 189–195 of delay line 176. As a result, the pulses 210'–216' of FIG. 5D appear in time succession at the output connection 196. Only pulses 210'–214' appear on the time scale of FIG. 5.

It should be noted that the system of FIGURE 4 gates alternate groups of pulses from input 28 to outputs 66 and 196, respectively. The repetition rate of each group of pulses so transferred is slowed by the action of delay lines 16, 18 and 176. The signals present at outputs 66 and 196 may be sent over separate limited bandwidth channels by available data link transmission means. A similar result may be achieved by providing two delay units between each of the taps 29–35, connecting the taps 29–35 to delay line 16 only as shown in FIG. 1 and connecting the new intermediate taps (not shown) to delay line 176 by way of gates 179–185. In this embodiment of the invention all of the gates 69–75 and 179–185 would be pulsed simultaneously.

Figure 3:
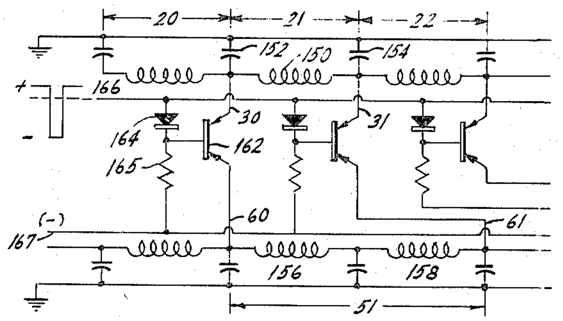
FIG. 3 is a detailed circuit diagram of a representative portion of the system of FIG. 1.

FIG. 6 illustrates a system for recombining the signals present at outputs 66 and 196 to recover the signal represented in waveform A in FIGURE 5. Delay lines 16, 176 and 18 of FIGURE 6 correspond to similarly numbered elements in FIG. 4. Terminations 68', 188' and 38' correspond to terminations 68, 188 and 68 of FIGURE 4 except that the are connected to the outputs of delay lines 16 and 176 and to the input of delay line 18 respectively. Gate means 69'–75' and 179'–185' correspond to gates 69–75 and 179–185 except that the direction of signal flow through the gates is reversed. If the gates are bidirectional gates as shown in FIG. 3, gates 69'–75' and 179'–185' may be identical to gates 69–75 and 179–185. The common connections 82 and 186 to the gate means of FIGURE 6 correspond to similarly numbered connections in FIGURE 4.

Waveform A in FIGURE 7 shows two pulses 220, 222 of the series of pulses supplied to connection 82 of FIGURE 6. Waveform B of FIGURE 7 shows one pulse 224 in the series of pulses which are supplied to common gate connection 186 of FIGURE 6. The time spacing between the pulses in the series shown in waveform B is the same as the spacing in waveform A.

It will be assumed that the signals shown in waveforms C and E of FIG. 5 are supplied to inputs 58 and 198 respectively of delay lines 16 and 176. As explained above signals corresponding to pulses 85′–91′ will appear simultaneously at the taps 59–65 of delay line 16. Pulse 220 is phased to coincide with the appearance of these signals of taps 59–65. Pulses 85″–91″ and 120″ represent the pulses appearing at output 40 of delay line 18 as the result of the signals passed by gate circuits 69′–75′ respectively. The time spacing between pulses 85″ and 91″ of FIGURE 7 will be less than the time spacing between pulses 85′ and 86′ of FIGURE 5 since pulse 85″ will have ben delayed by six sections of delay line 16 whereas pulse 86″ will have been delayed by only five sections of delay line 16 and one section of delay line 18. The time gap between pulse 91″ and 120″ in FIGURE 7 corresponds to the gap between pulse 91 and 120 in FIGURE 5. The signals corresponding to pulses 210′–216′ are transferred to delay line 18 from delay line 176 by way of gate means 179′–185′ in response to the signal 224 in waveform B of FIGURE 7. Pulses 210″–214″ correspond to pulses 210′–214′ of FIGURE 5 except that the interpulse period has been reduced for the reason just explained. Thus the total signal appearing at output 40 of delay line 18 in FIGURE 6 is the waveform shown at D in FIGURE 7. It will be seen that this waveform corresponds exactly to the original waveform shown at A in FIGURE 5.

Obviously the delay line 176 and gates 179′–185′ may be omitted from the system of FIGURE 6 to provide a system for increasing the information rate of pulses while leaving gaps between groups of pulses. The time between successive groups of pulses may be utilized in any desired manner. For example other forms of multiplex equipment may be employed to insert signals in the spaces between pulses 91″ and 120″.

The embodiment of the invention shown in FIGURE 8 multiplexes signals from three different sources in a preselected manner. This embodiment comprises three input delay lines 240, 242 and 244 and a single combining delay line 246. Delay line 246 is provided with input connections 250–258 and an output connection 260. Termination 262 is coupled to the end of the delay line 246 which is opposite output connection 260 to absorb any signals which may be propagated from right to left as the delay line is shown in FIGURE 8.

Delay line 240 is provided with output taps 264, 265 and 266 which are coupled to taps 252, 253 and 254 respectively by way of gates 252′, 253′ and 254′. Input delay line 242 is provided with output taps 270, 271 and 272 which are connected to taps 251, 260 and 255 respectively through the respective gate circuits 251′, 260′ and 255′. Similarly delay line 244 has output taps 274, 275 and 276 coupled to taps 250, 257 and 256 by way of the respective gates 250′, 257′ and 256′. Delay lines 240, 242 and 244 are further provided with input connections 280, 282 and 284 and respective terminating impedances 290, 292 and 294.

In the embodiment of FIGURE 8 delay line 240 is made up of two sections 298 and 302 each of which has a delay time of $3d_3$. This may be accomplished by forming each of the sections 298 and 302 of three of the sections 296 having a delay time $d_3$. Alternatively different constants can be employed to give the desired greater delay in delay line 240. Delay line 282 is made up of two sections 304 and 306 each having a delay time equal to $3d_3$. Similarly the two sections 308 and 310 of delay line 244 have a delay time of $3d_3$.

The operation of the embodiment of FIGURE 8 is similar to the operation of the embodiment of FIGURE 6 except that all of the gates 250′–258′ are enabled simultaneously by a signal supplied to common input connection 299. It will be assumed that the gating signals supplied to connection 299 have a duration equal to or only slightly less than $d_3$ seconds. Three separate input signals are supplied to the respective inputs 280, 282 and 284. These input signals may be a variable amplitude signal such as shown at waveform D in FIGURE 2 or it may comprise spaced pulses as shown at waveform A of FIGURE 2. If the input signals are in the form of pulses the interpulse period should be equal to the delay time $d_3$. The pulses supplied to common gate connection 299 have an interpulse period of not less than $9d_3$ seconds. Preferably the interpulse period is exactly equal to $9d_3$ seconds. The signal appearing at output 260 will be a series of pulses having an interpulse period equal to $d_3$ seconds and a duration equal to the duration of the pulses supplied to gate circuits 250′–258′ or the duration of the pulses supplied at inputs 280, 282 and 284 whichever is the shorter.

FIGURES 9 and 10 illustrate one application for the particular embodiment of the invention shown in FIGURE 8. FIGURE 9 represents the actual scan pattern of a flying spot scanner having three spots 320, 322 and 324 which scan in unison along parallel tracks 326, 328 and 330. FIG. 10 represents the apparent scan pattern of a hypothetical single beam flying spot scanner as represented by the signal at output 260. The solid line arrows 331–339 represent the apparent scan pattern of a hypothetical single beam of the scanner. The broken line arrows connecting arrow 331–339 represent the apparent "flyback" path of the hypothetical single scanning beam in the intervals between signals at output connection 260. The small area scan pattern shown in FIGURE 10 is useful in data conversion equipment of the type disclosed and claimed in the copending application of John B. Chatten, Charles Teacher and Melvin E. Partin, Serial No. 192,178, filed May 3, 1962.

It will be obvious that other complex scan patterns may be synthesized by appropriate connections between delay line 240, 242 and 244 and the signal combining delay line 246.

While there has been described what is at present considered to be the preferred embodiment of the invention, it will be apparent that various modifications and other embodiments thereof will occur to those skilled in the art within the scope of the invention. Accordingly I desire the scope of my invention to be limited only by the appended claims.

What is claimed is:

1. A signal processing system comprising, an input delay means, said input delay means having an input connection and a plurality of selected spaced output taps, the delay between adjacent selected output taps being equal to $nd_1$ where $n$ is an integer and $d_1$ is a fixed time delay, the delay time between any pair of adjacent selected output taps being equal to the delay time between any other pair of adjacent selected output taps, an output delay means, said output delay means having an output connection and a plurality of spaced selected input taps, the delay between adjacent selected input taps being equal to $(ad_2)$ where $a$ is any integer and $d_2$ is a fixed time delay, the delay time between any pair of adjacent selected input taps being equal to the delay time between any other pair of adjacent selected input taps, a plurality of gate means, each gate means coupling a selected output tap on said input delay means to a selected input tap on said output delay means, successive selected output taps on said input delay means being connected to successive selected input taps on said output delay means, and control means coupled to each said gate means for simultaneously conditioning said plurality of gate means to enable each of said gate means to pass signals from the selected output tap associated therewith only at selected spaced regularly recurring time intervals, said selected spaced time intervals for each gate means being separated in time by not less than the time delay of the delay means having the longer time delay, said spaced time intervals having a duration not greater than the time delay between adjacent selected taps on said delay means having the shorter delay between adjacent selected taps.

2. A signal processing system in accordance with claim 1 wherein the delay time between adjacent selected taps on one delay means is an integral multiple of the delay time between adjacent selected taps on the other delay means.

3. A signal processing system comprising a first delay line having an over-all time delay equal to $D_1$, where $D_1$ is a fixed time delay, said first delay line having a signal connection at one end thereof and a plurality of spaced taps, a second delay line, a third delay line, said second and third delay lines each having an over-all time delay of $NP_1$ where N is an integer greater than one and $P_1$ is a fixed time delay, said second and third delay lines each having a signal connection at one end thereof and a plurality of spaced taps, there being one tap on each of said second and third delay lines for each tap on said first delay line, a first plurality of gate means, each gate means of said first plurality coupling a tap on said first delay line and a corresponding tap on said second delay line, a second plurality of gate means, each gate means of said second plurality coupling a tap on said first delay line and a corresponding tap on said third delay line, and control means coupled to each said gate means of said first plurality and each said gate means of said second plurality for conditioning simultaneously each said gate means of said first plurality to pass signals from one said tap associated therewith to the other said tap associated therewith only at selected spaced time intervals, and for conditioning simultaneously each said gate means of said second plurality to pass signals from one said tap associated therewith to the other said tap associated therewith only at selected spaced time intervals, the time intervals at which said first plurality of gates are conditioned being spaced from the time intervals at which said second plurality of gates are conditioned, said spaced time intervals at which said first and second plurality of gates are conditioned having a duration less than the time delay between adjacent taps on said first delay line.

4. A signal processing system comprising a first delay line, said first delay line including an output connection and a plurality of input taps, the time delay between adjacent taps on said first delay line being equal to *d*, a plurality of additional delay lines, each of said additional delay lines including an input connection and a plurality of output taps, the time delay between adjacent taps on said additional delay lines being equal to *nd* where *n* is the number of additional delay lines, a plurality of gate means, each of said gate means coupling one tap of one of said additional delay lines to a selected one of said taps on said first delay line, and control means coupled to each of said gate means for simultaneously conditioning all of said gate means to pass a signal, said gate means being conditioned to pass a signal only at selected spaced time intervals, said time intervals during which said gate means are conditioned to pass signals having a duration less than the time delay between adjacent taps on said first delay line.

5. A signal processing system in accordance with claim 3 wherein said taps on said first delay line to which said first plurality of gate means are connected include taps to which said second plurality of gate means are connected.

6. A signal processing system in accordance with claim 3 wherein there are equal numbers of gate means in said first plurality and in said second plurality and wherein said taps on said first delay line to which said first plurality of gate means are connected are the same taps to which said second plurality of gate means are connected.

7. A signal processing system in accordance with claim 6 wherein said selected spaced time intervals for each plurality of gate means are separated in time by not less than the time delay of said delay means having the longer time delay.

References Cited by the Examiner

UNITED STATES PATENTS

| | | | |
|---|---|---|---|
| 2,403,561 | 7/46 | Smith | 328—152 |
| 2,478,778 | 8/49 | Oliver | 333—29 |
| 2,545,871 | 3/51 | Bell | 179—15.55 |
| 2,719,188 | 9/55 | Pierce | 179—15 |
| 3,109,070 | 10/63 | David et al. | 179—15.55 |

JOHN W. HUCKERT, *Primary Examiner.*

DAVID J. GALVIN, *Examiner.*